INVENTORS:
MORRIS A. SCHWARTZ
ROLAND B. BILANE.
BY
Arnold S. Worfolk
ATTORNEY

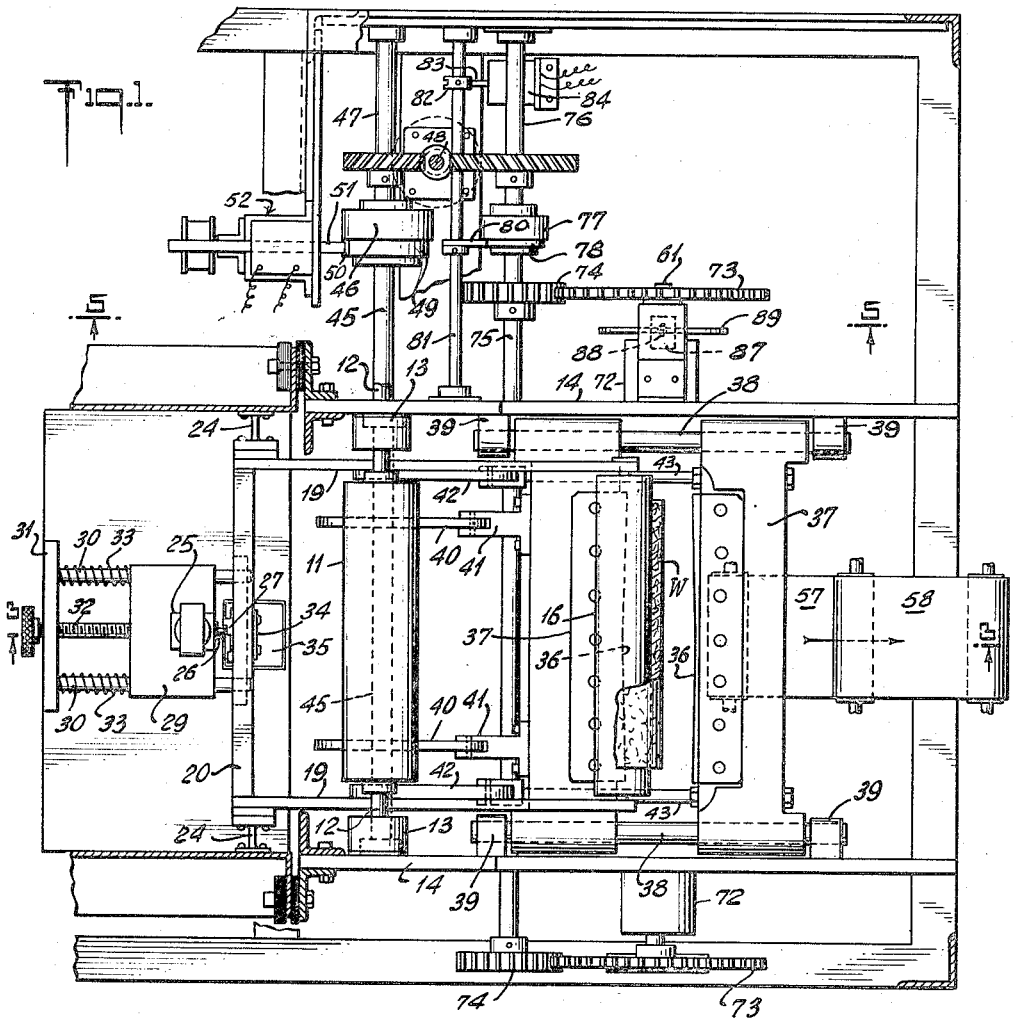

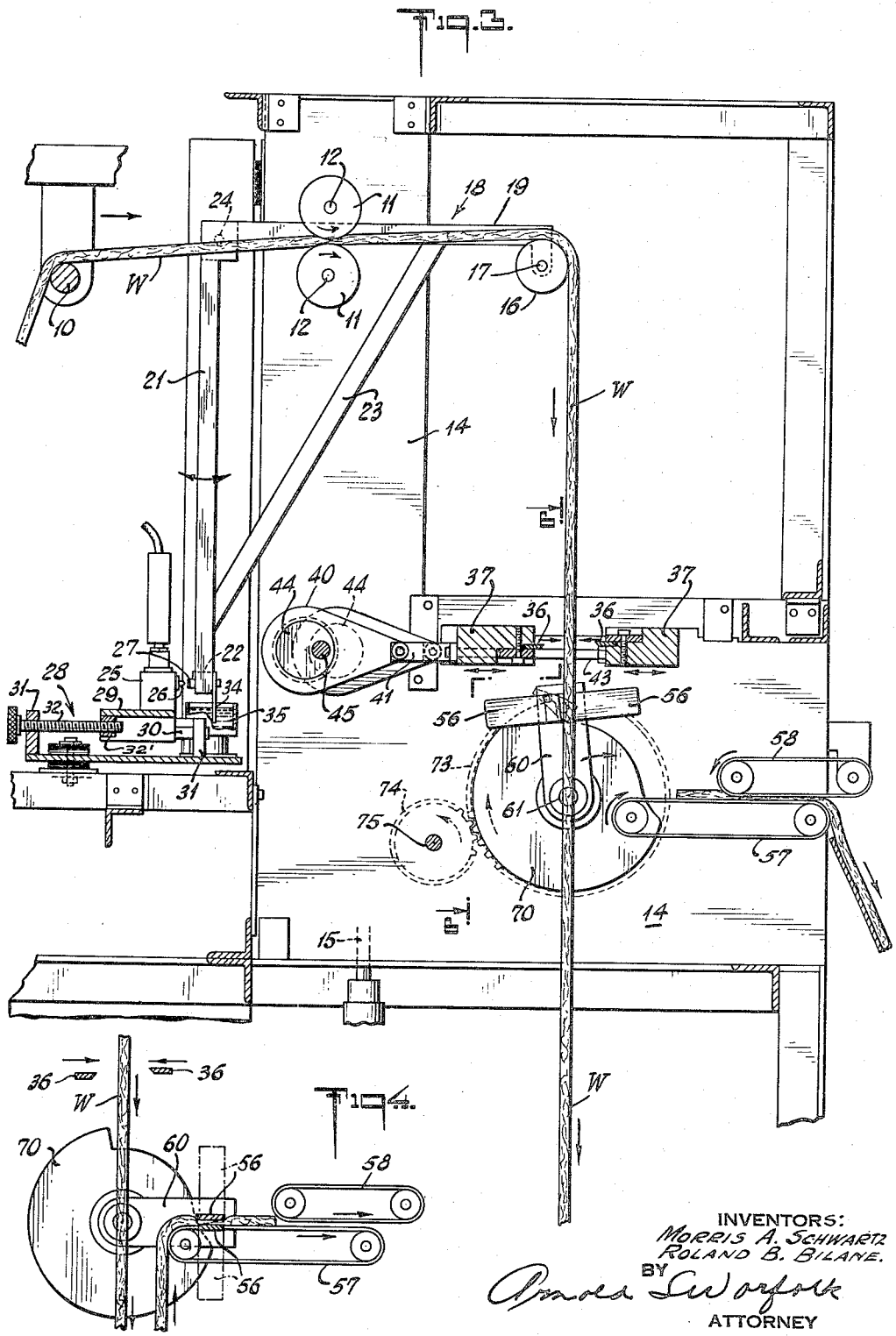

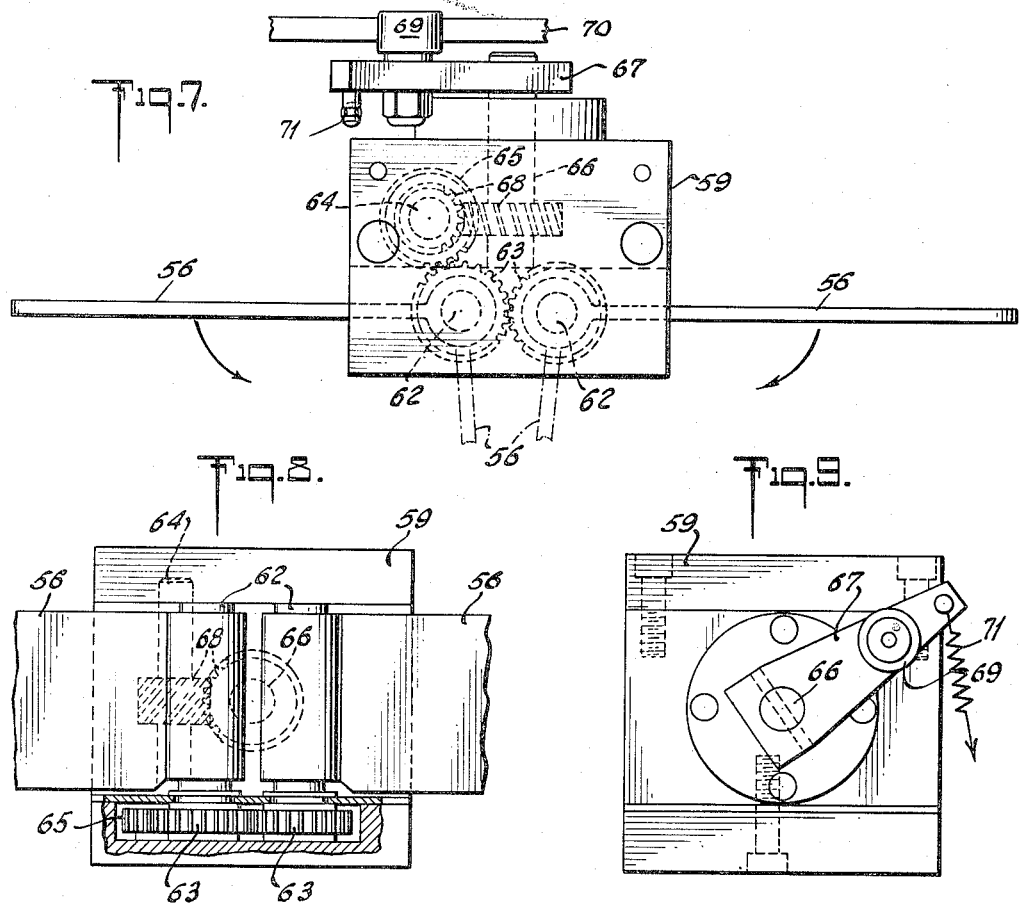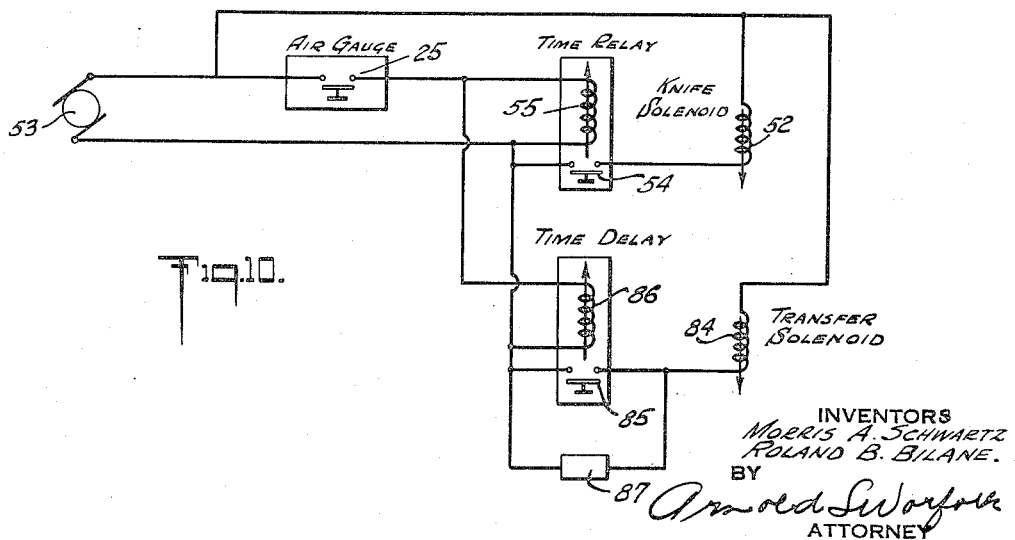

UNITED STATES PATENT OFFICE 2,691,517

WEB WEIGHING

Morris A. Schwartz, North Plainfield, and Roland B. Bilane, West Keansburg, N. J., assignors to Johnson & Johnson, a corporation of New Jersey Application August 28, 1951, Serial No. 244,052

5 Claims. (Cl. 265—49)

This invention relates to apparatus for continuously dispensing web material, weighing portions thereof, severing the weighed portions and delivering the severed portions to a desired place.

The problems with which the invention is concerned occur in connection with weighing different kinds of web material of varying flexibility, as for example surgical cotton which, after leaving a card line, is cut into small units for packaging and sale on a weight basis. Thus the invention is particularly adapted to the weighing of cotton and for illustration only is described as applied to apparatus for continuously weighing such material and severing the weighed portions thereof which are then transferred to some other place for further processing.

Heretofore, many operations involved in the weighing of cotton for packaging for consumer sale were performed manually, and accuracy in the weighing operation depended chiefly upon the skill and attentiveness of the operator. The improved machine dispenses with the services of an operator, and performs the weighing operation quickly, continuously, and automatically and with a very high degree of accuracy. Many economic savings are thus realized from the standpoint both of labor and materials cost.

Essentially the improved apparatus includes a scale beam supported at one end upon torsion pivots and provided at its other end with a roller over which the web material travels in the process of being weighed. The web material after passing over the roller hangs downwardly under the influence of gravity causing a deflection in the scale beam which is resisted by the torsion pivots. According to the invention, the web material is led to the roller at the end of the scale beam in a path which if projected passes directly through the torsion pivot. As a result, the only rotational moment which must be resisted by the torsion pivots is that due to the weight of the web material supported by the roller, and the extent of deflection of the scale beam is directly proportional to such weight. Accuracy in weighing is thus assured.

When a given deflection of the scale beam occurs, the weighed portion of material to be severed from the flexible web will have been determined. However, the trailing end of such portion, i. e., the line of severance, at the instant of its determination is in advance of the scale beam roller and severing of the web at that location would interfere with the continuous operation of the device. The severing operation accordingly is designed to take place when the predetermined line of severance, during the travel of the web, reaches a location beyond the scale beam roller. A cutting device is arranged at such location and its operation is automatically timed to take place the instant the predetermined line of severance arrives abreast of it.

The improved apparatus also includes a transfer device for grasping the severed portion of web material and moving it out of the path of the oncoming web which continues to be dispensed. This device transfers the severed portion of web material to some other place or means, as for instance, a transporting device which carries it away for some other operation. The transfer device also operates automatically, being controlled by timing devices quite similar to those which control operation of the knives.

A better understanding of the invention may be had by reference to the accompanying drawings wherein:

Fig. 1 is a plan view of apparatus equipped with the present improvements;

Fig. 2 is a perspective view showing details of one of the torsion pivots supporting the scale beam;

Fig. 3 is a vertical sectional view on line 3—3 of Fig. 1;

Fig. 4 is a partly schematic view illustrating operation of the web transfer device;

Fig. 7 is an enlarged plan view showing details of the web transfer mechanism;

Fig. 8 is an elevation of the parts shown in Fig. 7, a portion of the housing being cut away to show operating mechanism;

Fig. 9 is an elevation of the parts shown in Fig. 7 but viewed from the side opposite that illustrated in Fig. 8; and Fig. 10 is a wiring diagram of time delay circuits by which the cutting and the transfer mechanisms are controlled.

Figure 5:
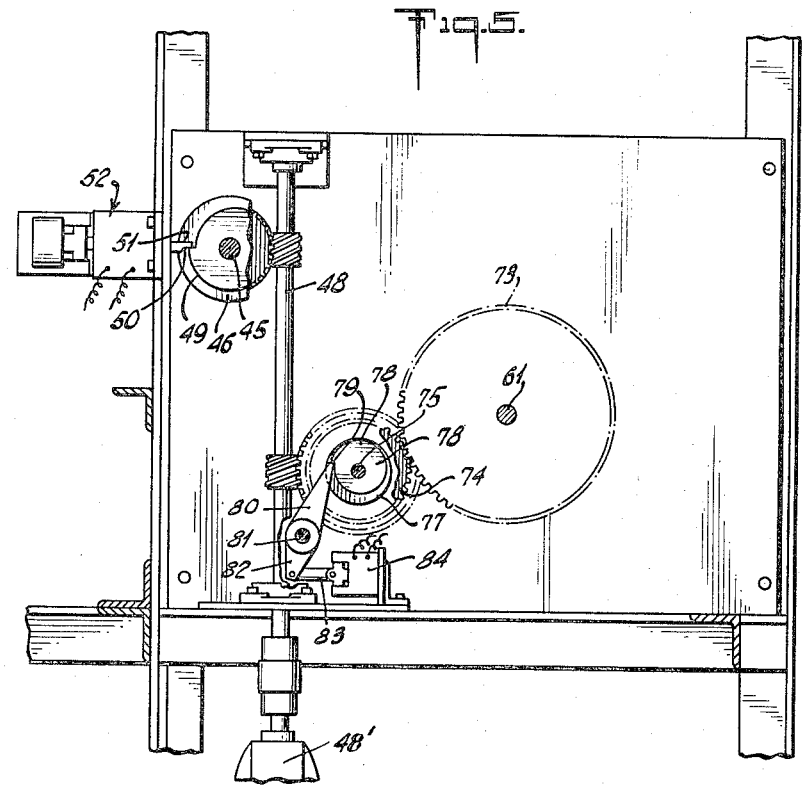
Fig. 5 is a vertical sectional view on line 5—5 of Fig. 1.

A continuous flexible web of material W such as cotton is drawn over a guide bar 10 by a pair of continuously driven pull rollers 11 located one above and one below the web (Figs. 1 and 3). The rollers 11 are fixed on horizontal, parallel transverse shafts 12 journalled in bearings 13 fixed on the machine frame 14 and are continuously driven in opposite directions from a vertical drive shaft 15 through appropriate intermediate gearing, not shown. The pull rollers 11 deliver the web W in a substantially horizontal direction to a roller 16 over which it passes and from which it travels vertically downwardly under the influence of gravity. According to this arrangement, such tension as there exists in the flexible web W after it leaves the pull rollers 11 is due solely to the weight of that portion of the web which hangs from and is supported by roller 16.

The roller 16 is disposed horizontally and parallel with the pull rollers 11 and is arranged for rotation on a shaft 17 located at the end of a scale beam unit 18. The scale beam unit is in the form of an inverted L and includes two laterally spaced horizontal arms 19 which are connected together at one end by the roller shaft 17 and at the other end by a cross strut 20. The smale beam unit also includes two spaced parallel vertical arms 21 fixed to and depending from the horizontal arms 19 at the location of the cross strut 20 and which in turn are connected together at the bottom by a cross strut 22. Two angularly disposed reinforcing struts 23 tie together the vertical and horizontal arms at the respective sides of the scale beam unit to lend it rigidity.

The inverted L-shaped scale beam unit 18 is supported in the fixed frame 14 of the machine only where the horizontal and the vertical arms thereof are joined together. This support consists of a pair of short torsion pivot bars 24 fixed one between the scale beam unit at one side and the adjacent part of the fixed machine frame, and the other, in coaxial alignment therewith, but betwen the opposite side of the scale beam unit and the corresponding adjacent part of the fixed machine frame (Figs. 1 and 2). The arrangement is such that the torque resulting from the summation of rotational moments due to the forces acting upon the scale beam unit is resisted by the torsional pivot bars 24, which resistance however, permits deflection of the scale beam unit by an amount proportional to the summation of such rotational forces. Since the path of that portion of the traveling web W between the pull rollers 11 and the roller 16 will, if projected, pass through the axis of the torsion supporting pivots 24, the force acting upon the scale beam unit due to tension in that portion of the web produces no moment of rotation about such axis. This is particularly important where the web material is of varying flexibility or to put it another way, of varying rigidity which will be reflected in a varying tension in that portion of the web referred to even though the weight of that portion of the web overhanging the roller 16 is otherwise the same. Indeed, the only force tending to produce a rotational moment about the pivot support is that which pulls downwardly on the roller 16 and which results from the weight of web supported by the roller. Consequently, the degree of scale beam unit deflection will be proportional to such weight.

Assuming the machine is set to dispense a given weight of cotton web which is to be severed, the line of severance will have been determined when the scale beam reaches a given deflection. This line of severance at the moment of its determination will be located in advance of the roller 16, i. e., between the pull rollers 11 and the roller 16. To insure continuity of machine operation, however, severance of the web does not occur until after such predetermined line has traversed roller 16 and has arrived down opposite a cutting mechanism later to be described.

The line of severance is predetermined as follows: Opposite and to the left of the cross strut 22 joining the vertical members 21 at the bottom of the scale beam (Figs. 1 and 3) there is located an air pressure operated electric switch 25, whose details need not be described, since it may be of well known commercial type. The switch unit has an air aperture 26 which so long as air continues to flow unrestrictedly therefrom maintains the switch in opened condition. Such is the normal condition of the parts. However, when the scale beam unit 18 is deflected to a predetermined position corresponding to a given weight of cotton supported by the scale beam, a restriction plate 27 fixed on the lower cross strut 22 of the scale beam approaches the air aperture and restricts the flow of air therefrom. A back pressure is thereby built up in the switch unit, which upon reaching a given value closes the electrical switch 25. The line of severance of the web is thereby determined. Variation in the weight of cotton to be severed as well as adjustment for miscellaneous but constant rotational moments acting about the scale beam pivot, may be obtained by varying the distance through which the scale beam moves before the back pressure is such as to operate the switch. This may be accomplished by mounting the air operated electric switch 25 on an adjustable slide 29, which may consist of a small platform 29 for supporting such switch, mounted for movement toward and from the cover plate 27 on a pair of parallel guide rods 30 extending between a pair of fixed supports 31 (Figs. 1 and 3). Adjustment in the position of the platform 29 is secured by a rotatable rod 32 which passes through the outer support 31 and which is threaded through a block 32 depending from the platform 29. A pair of springs 33 encircling the guide rods 30 and reacting between the outer suport 31 and the adjustable platform 29 serves to eliminate play and thus assures accuracy in the adjustment. Accuracy in weighing the desired amount of cotton may be also secured by damping the movement of the scale beam through the provision of a baffle plate 34 depending from the lower cross strut 22 of the scale beam unit 18 into an underlying oil-filled reservoir 35 (Fig. 3).

The web severing device will now be described. As the flexible web W travels downwardly from the roller 16 at the end of the scale beam unit 18 it passes between a pair of knives 36 located one in front and the other in back of the web. The knives normally are spaced apart a distance to permit the web to pass between them without interference. However, when the line at which the web is to be severed arrives abreast of the knives, they are automatically moved toward each other to cut off that portion of the web which previously had been weighed. For this purpose the knives are mounted each on a sliding block 37. The blocks are slidably supported at their opposite ends on a pair of horizontal, parallel guide bars 38 which in turn are supported at their ends in brackets 39 mounted on the fixed frame of the machine (Figs. 1 and 3). The block 37 carrying the knife located at one side of the web is connected to a pair of eccentric rods 40 evenly spaced from the ends of the block through relatively short intermediate connecting rods 41 whereas the other block carrying the knife located at the opposite side of the web is connected to a pair of eccentric rods 42 spaced at the end of such block, through longer connecting rods 43. The eccentric rods are arranged on eccentrics 44, fixed on a driven shaft 45 in such manner as to move the sliding blocks in opposite phase as the shaft 45 is rotated. In other words as the shaft 45 turns through one revolution, the knives are moved from their normal separated position toward each other to shear through the web and then away from each other back to normal position.

The shaft 45 is connected through a cut-off clutch 46 with a continuously rotating shaft 47 geared to a vertical drive shaft 48 driven by motor 48' (Figs. 1 and 5). The clutch 46 presents a cam surface 49 having an abutment 50 normally resting against a bar 51 constituting the armature of a solenoid 52. When the solenoid is energized, its armature is withdrawn from in front of the abutment 50 permitting engagement of the clutch and connection of the continuously rotating shaft 47 with shaft 45 on which the eccentrics are mounted. The clutch remains engaged until such shaft has completed one revolution, whereupon the abutment engages bar 51 which, in the meantime, has been restored to its normal position through deenergizing of solenoid 52. The clutch is thereby disengaged leaving the knife blades 36 in their normal separated positions.

A better understanding of the way in which solenoid 52 is energized may be had by reference to the circuit diagram of Fig. 10. The solenoid 52 is connected to a source of power 53 through a circuit which includes a normally open switch 54 operated in turn by a time delay relay 55 which is energized when the air operated electric switch 25 is operated. It will be recalled that the switch 25 was operated when the scale beam unit 18 assumed a given deflection determinative of the line at which the web is to be severed. The time delay relay 55 is such that even though energized it does not operate to close the switch 54 until the predetermined line of severance of the web has arrived abreast of the knives 36. At that time the switch 54 automatically closes energizing the solenoid 52 to operate the knives in the manner previously described. As soon as the predetermined section of web W has been severed, the scale beam unit 18 returns to its normal position permitting the air operated electric switch 25 to open. The time delay relay 55 and solenoid 52 are thereby deenergized and the parts all rendered operative for weighing and severing the next portion of the web.

The severed portion of web W is grasped and transferred out of the path of the oncoming web. Transfer may be to a belt or other mechanism for carrying the web away to another place. The transfer mechanism is best shown in Figs. 3 to 9.

It consists in part of two pairs of grip fingers 56 located one pair adjacent each of the lateral edges of the traveling web W and directly beneath the cutting knives 36 (Figs. 3, 6, 7 and 8). In their normal positions the grip fingers 56 are open or spread apart as indicated by solid lines in Fig. 7. Simultaneously with cutting of the web however, the fingers of the respective pairs are swung inwardly toward each other to grasp the web between them as indicated by dotted lines in Fig. 7 and in Fig. 6. The fingers 56 move in to grasp the severed portion of the web near its upper end and while it is still in line with the oncoming web. As soon as the web has been grasped however, the fingers 56 are rotated from the position shown in Fig. 6 to the position shown in solid section in Fig. 4. This movement of the fingers transports the severed portion of the web out of the path of the oncoming continuous web and deposits the end thereof on the top flight of a continuously moving endless belt 57. Thereupon the fingers are spread apart to release the severed web which immediately comes under the influence of the bottom flight of an endless belt 58 overlying the belt 57. The top and the bottom flights of the belts 57 and 58 respectively travel in the same direction and co-operate with each other to transport the severed web away. The pairs of fingers 56, now spread apart, continue their rotation in the same direction until restored to their normal positions ready for grasping the severed section of web which follows.

Except for being one right hand and the other left hand, each of the pairs of fingers 56 located at the opposite edges of the web and their operating mechanisms are the same. Consequently only one need be described.

The fingers 56 are arranged in a head 59 carried at the outer end of a crank arm 60 fixed on a short horizontal rotatable stub shaft 61 which upon rotation, moves the finger assemblies in vertical planes at right angles to the plane of the traveling web. The fingers 56 are fixed on parallel shafts 62 journalled in the head 59 and provided at their lower ends with intermeshing spur gears 63 of the same size so that rotation of one finger in one direction is accompanied by corresponding rotation of the other finger in the reverse direction. A third shaft 64 parallel with shafts 62, is journalled for rotation in the head 59 and it likewise is provided at its lower ends with a spur gear 65 meshing with one of the spur gears associated with the fingers. Likewise journalled in the finger carrying head 59 is still another shaft 66, perpendicularly disposed as regards the plane of the finger shafts 62, and which extends for a short distance externally of the head to receive a short crank arm 67 which is fixed thereto. Rotation of the shaft 66 will, through a pair of co-operating helical gears 68, effect rotation of the shaft 64 and consequently rotation of the gripping fingers 56 toward and from each other.

Figure 6:
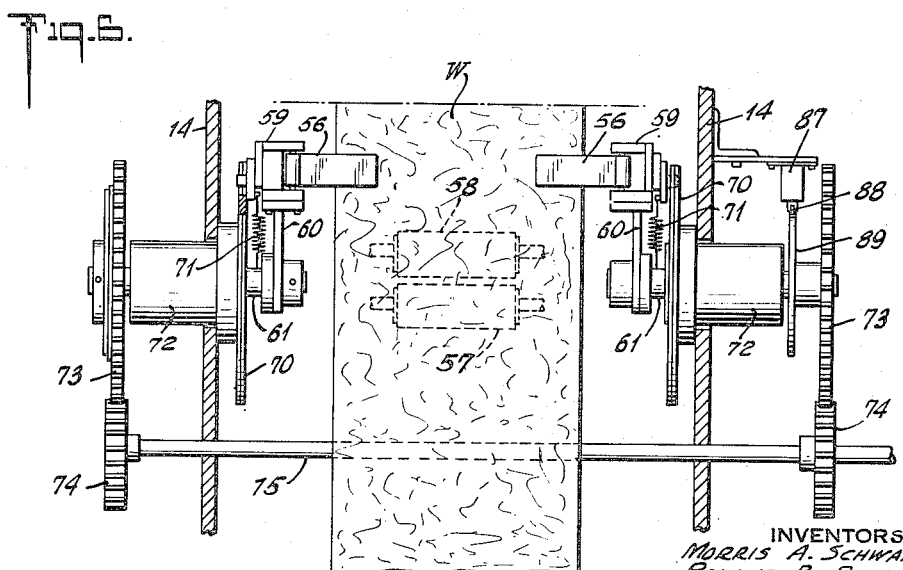
Fig. 6 is a partial sectional view on line 6—6 of Fig. 3.

The crank arm 67 is equipped near its outer ends with an anti-friction roller 69 arranged to track along a fixed edge cam 70 disposed in a vertical plane perpendicular to the plane of the traveling web. Engagement of the anti-friction roller 69 with the edge cam 70 is maintained by a tension spring 71 connected at one end to the crank arm 67 at its outer end, and anchored at its other end to the stub shaft 61 (Fig. 6). In the normal position of the parts, the anti-friction roller 69 bears upon a high concentric portion of the edge cam 70. However, as soon as the crank arm 60 which carries the finger carrying head 59 starts rotating, the anti-friction roller 69 drops off the high portion of the edge cam 70 and on to a low concentric portion thereof. This causes the crank arm 67 which carries the anti-friction roller 69 to be angularly displaced by an amount sufficient to close the fingers and grasp the web.

The low concentric portion of cam 70 extends for about 90° around its periphery. The fingers 56 accordingly maintain their grasp of the web W until the latter has been transferred to the belt device 57, 58 previously alluded to. As the web is delivered to the belt device the anti-friction roller 69 rides up on the high portion of the cam 70 to restore the fingers 56 to their normal positions with respect to their finger carrying head where they remain while the crank arm 60 continues to rotate in the same direction around to its normal position.

The stub shafts 61 by which the finger assemblies are rotated are rotatably arranged in bearings 72 mounted in fixed parts of the machine frame adjacent opposite edges of the traveling web W and the fixed cams 70 are secured respectively to the inner opposed faces of these bearings. The stub shafts 61 are provided each at their outer ends with a spur gear 73 meshing with a corresponding gear 74 fixed on a transverse driven shaft 75, the gear arrangements being such that two revolutions of the driven shaft 75 are required to effect a single revolution of the stub shafts 61 and the fingers 56 operated thereby.

The driven shaft 75 is connectable with a continuously rotating shaft 76 coaxially aligned with the shaft 75 and as is the shaft 75, journalled in the fixed frame of the machine, and helically geared to the main drive shaft 48 of the machine through a cut-off clutch 77 similar to that in the train of connections operating the cut-off knives. This clutch (Figs. 1 and 5) has a cam plate 78 presenting an abutment 79 engaging the upper end of an arm 80 fixed on and extending upwardly from a rock shaft 81 arranged parallel with the driven shaft 76 which normally holds the clutch disengaged. The rock shaft 81 is journalled at its ends in the fixed machine frame and has fixed to it, a depending arm 82 pivotally connected at its lower end to the armature 83 of a solenoid 84.

Having reference to Fig. 10, the solenoid 84 is in circuit with a source of power 53, the circuit including a normally open switch 85 adapted to be closed by a time delay relay 86 energized by the closing of the air valve operated by switch 25. Here again the time delay relay 86 is so designed as to effect operation of the switch 85 and energization of the solenoid 84 simultaneously with cutting of the web. As solenoid 84 is energized, it acts through its armature 83 and arm 82 to rock shaft 81 and arm 80 thereon in a counterclockwise direction, looking at the parts in Fig. 5, thereby to release the clutch cam plate 78 and effect connection between the continuously rotating shaft 76 and the shaft 75 which drives the finger transfer mechanism.

Since shaft 75 requires two revolutions to complete the cycle of the finger transfer device, means are provided for maintaining solenoid 84 energized until after one revolution of shaft 75 has been completed. This means includes a switch 87 (Fig. 10) which when closed short circuits the switch 85 operated by the time delay relay 86 to maintain solenoid 84 energized even though the relay 85 has in the meantime been opened. Switch 87 is mounted on a fixed part of the machine and is operated by an anti-friction roller 88 arranged to track along an edge cam 89 fixed on one of the stub shafts 61, as for instance the one at the right in Fig. 6. This cam is for the most part concentric except for a low portion which is opposed to the anti-friction roller 88 when the parts are in their normal positions. When rotation of stub-shaft 61 is inaugurated in the manner previously described, anti-friction roller 88 is raised by engagement with the high portion of the cam, to close switch 87 and maintain the solenoid 84 energized until just prior to the time that the stub shaft 61 completes its revolution whereupon the low portion of the edge cam 89 again is presented to the anti-friction roller. The switch 87 is so designed that when this occurs it opens to break the circuit through the solenoid. Deenergization of the solenoid permits restoration of the arm 80 to its normal position wherein the abutment 79 on the clutch cam plate will bank against it to effect disengagement of the clutch 77.

It should be noted that the belt device 57, 58 will not interfere with rotation of the grip fingers 56 since the ends of the latter will clear the lateral edges of the belt even when in their closed or gripping positions (Fig. 6). Nor will the fingers during completion of the operating cycle after the web has been deposited on the belt conveyor, interfere with the oncoming cotton web because the fingers at that time in the cycle, are in their normal separated positions.

The invention has been described in connection with the preferred embodiment thereof but many modifications are included within its spirit. It is to be limited therefore, only by the scope of the appended claims.

The invention claimed is:

1. A device for weighing dispensed portions of a continuously traveling flexible web of material, which comprises a scale beam unit rotatable in response to the summation of moments acting on the scale beam unit about an axis of support therefor, means on the scale beam unit spaced from said axis for supporting the flexible web as it continuously travels thereover and through which the weight of the web is transmitted to the scale beam unit, and means for guiding the flexible web in its travel toward and on to said supporting means in a plane which contains said axis of support.

2. A device for weighing dispensed portions of a continuously traveling flexible web of material, which comprises a scale beam unit rotatable in response to the summation of moments acting on the scale beam unit about an axis of support therefor, means on the scale beam unit spaced from said axis for supporting the flexible web as it continuously travels thereover and through which the weight of the web is transmitted to the scale beam unit, and means including a pair of co-operating feed rollers whose axes are parallel with said axis of support for guiding the flexible web in its travel toward and on to said supporting means in a plane which contains said axis of support.

3. A device for weighing dispensed portions of a continuously traveling flexible web of material, which comprises a scale beam unit rotatable in response to the summation of moments acting on the scale beam unit in opposition to torsion exerted by means presenting an axis of support about which the moments act, means on the scale beam unit spaced from said axis for supporting the flexible web as it continuously travels thereover and through which the weight of the web is transmitted to the scale beam unit, and means for guiding the flexible web in its travel toward and on to said supporting means in a plane which contains said axis of support.

4. A device for weighing dispensed portions of a continuously traveling flexible web of material, which comprises a scale beam unit including a frame with lateral elements, rotatable in response to the summation of moments acting on the scale beam unit in opposition to torsion exerted by means presenting an axis of support about which the moments act, means on the scale beam unit connecting said lateral frame elements together, spaced from said axis and including a support for the flexible web as it continuously travels thereover and through which the weight of the web is transmitted to the scale beam unit, and means for guiding the flexible web in its travel toward and on to said support in a plane which contains said axis of support.

5. A device for weighing dispensed portions of a continuously traveling flexible web of material, which comprises a scale beam unit rotatable in response to the summation of moments acting on the scale beam unit about an axis of support therefor, means including a roller mounted on the scale beam unit parallel and in spaced relation with said axis for supporting the flexible web as it continuously travels thereover and through which the weight of the web is transmitted to the scale beam unit, and means for guiding the flexible web in its travel toward and on to said roller in a plane which contains said axis of support.

References Cited in the file of this patent

UNITED STATES PATENTS

| Number | Name | Date |
|---|---|---|
| 1,511,794 | Wright | Oct. 14, 1924 |
| 1,668,038 | Abbott | May 1, 1928 |
| 1,837,864 | Hadley | Dec. 22, 1931 |
| 1,871,039 | Cady | Aug. 19, 1932 |
| 2,182,408 | Phillips | Dec. 5, 1939 |
| 2,228,606 | Mason | Jan. 14, 1941 |
| 2,571,976 | Ward | Oct. 16, 1951 |

FOREIGN PATENTS

| Number | Country | Date |
|---|---|---|
| 663,079 | France | Mar. 29, 1929 |
| 315,122 | Great Britain | July 11, 1929 |